US007178730B1

(12) United States Patent
Jamison et al.

(10) Patent No.: US 7,178,730 B1
(45) Date of Patent: Feb. 20, 2007

(54) VOTE VERIFICATION SYSTEM AND METHOD

(75) Inventors: Clay R. Jamison, Atlanta, GA (US); Thomas G. Holzman, Marietta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/261,227

(22) Filed: Oct. 28, 2005

(51) Int. Cl.
*G06K 17/00* (2006.01)
*G06F 11/00* (2006.01)

(52) U.S. Cl. ........................................ 235/386; 705/12

(58) Field of Classification Search ................ 235/375, 235/386, 50 R, 50 A, 50 B; 705/12
See application file for complete search history.

(56) References Cited

U.S. PATENT DOCUMENTS 6,769,613 B2 * 8/2004 McDermott et al. ........ 235/386
6,892,944 B2 * 5/2005 Chung et al. ............... 235/386
6,968,999 B2 * 11/2005 Reardon ..................... 235/386
2005/0211778 A1 * 9/2005 Biddulph .................... 235/386
2006/0041468 A1 * 2/2006 Reardon ...................... 705/12

* cited by examiner

*Primary Examiner*—Uyen-Chau N. Le
*Assistant Examiner*—April A. Taylor
(74) *Attorney, Agent, or Firm*—Paul W. Martin; Priest & Goldstein, PLLC

(57) ABSTRACT

A vote verification system and method which provides assurance to voters that their votes were processed. The system includes a computer including a reader, wherein the computer is for reading machine-readable information on a receipt containing both the machine-readable information and human-readable information as the voter presents the receipt to the reader, obtaining identifying information associated with a ballot of the voter, and providing the identifying information so that a voter may compare the identifying information to the human-readable information on the receipt.

18 Claims, 2 Drawing Sheets

VOTE VERIFICATION SYSTEM AND METHOD

BACKGROUND OF THE INVENTION

With the rise in electronic voting kiosks, some people worry that voters' ballots may be deleted or altered without their knowledge, and the legitimacy of elections may be called into question. Ballots are open to manipulation. They can be thrown out, and some people may suspect that the ballot boxes can be stuffed by allowing some people to vote more than once. Some people have called for an auditable paper trail that can be used to validate election results.

Therefore, it would be desirable to provide a vote verification system and method.

SUMMARY OF THE INVENTION

A vote verification system and method is provided.

The system includes a computer including a reader, wherein the computer is for reading machine-readable information on a receipt containing both the machine-readable information and human-readable information as the voter presents the receipt to the reader, obtaining identifying information associated with a ballot of the voter, and providing the identifying information so that a voter may compare the identifying information to the human-readable information on the receipt.

DETAILED DESCRIPTION OF THE PREFERRED EMBODIMENT

Figure 1:
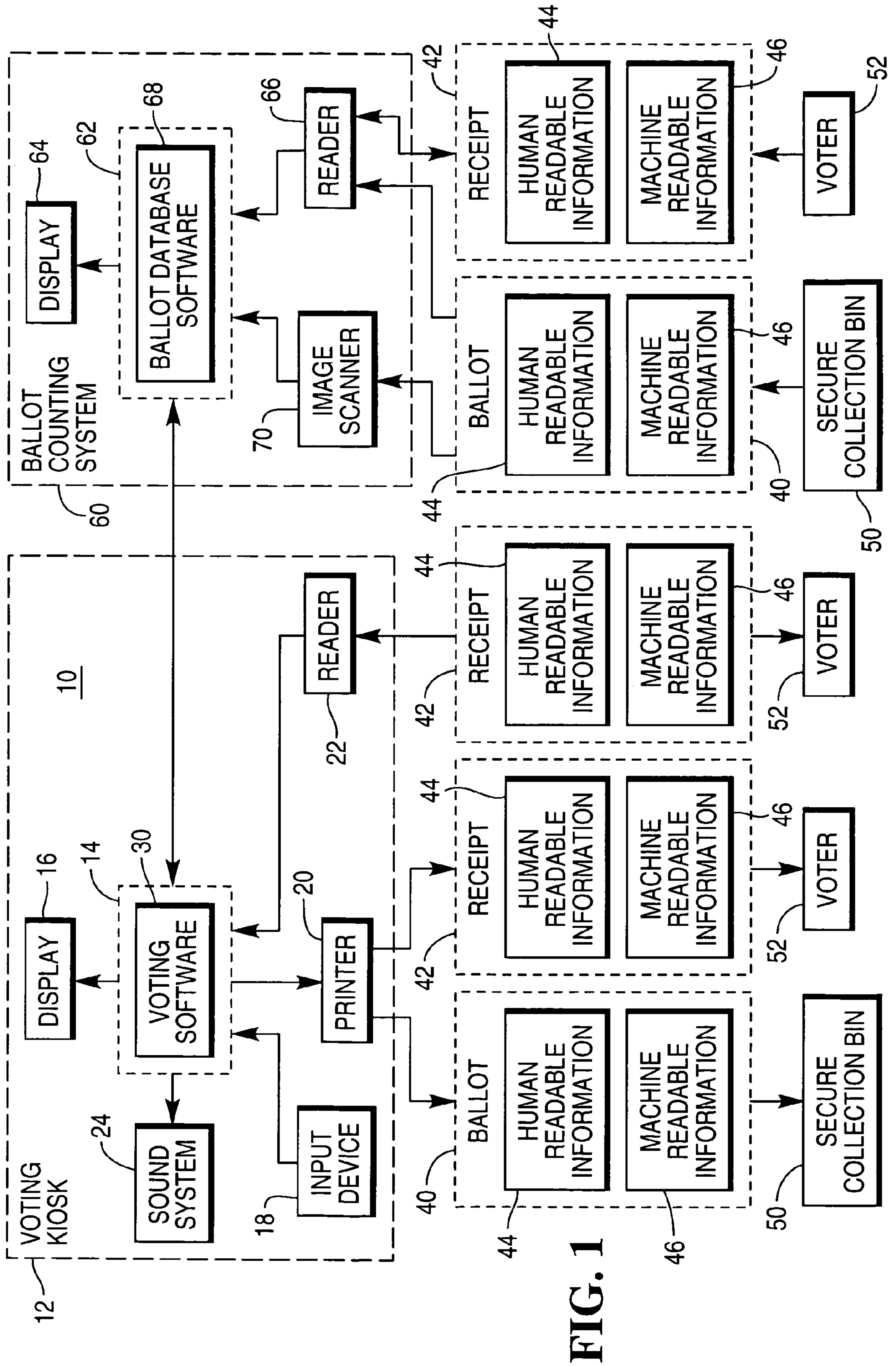
FIG. 1 is a block diagram of a voting system.

Referring now to FIG. 1, voting system 10 includes voting kiosk 12 and ballot counting system 60.

Voting kiosk 12 includes processor 14, display 16, input device 18, printer 20, reader 22, and sound system 24.

Processor 14 executes voting software 30 for displaying voting choices and for recording voter selections.

Display 16 displays the voting choices and voter selections. Display 16 may include a liquid crystal display.

Input device 18 records the voter selections. Input device 18 may include a touch overlay over display 16, forming a touch screen.

Printer 20 prints a ballot 40 following completion of voting. Printer 20 applies unique human-readable identifying information 44 and unique machine-readable information 46 on ballot 40. Ballot 40 is placed into secure collection bin 50 following voting.

Machine-readable information 46 may be in the form of a barcode label or radio frequency identification (RFID) label. Machine-readable information 46 acts as a reference to identifying information in a database, such as ballot database 72.

Both types of identifying information may include precinct, time, voting machine used, and other information helpful to verifying that a vote was actually completed and should be counted.

Printer 20 also prints receipt 42 for voter 52 which includes the same information as is printed or applied to ballot 40.

Reader 22 reads machine-readable information 46 on receipt 42. Voting software 30 requests corresponding identifying information from ballot database software 68 and displays the identifying information on display 16. Voter 52 may compare the displayed identifying information to human-readable information on receipt 42 before ballot 40 is dropped in secure collection bin 50.

Alternatively, voting software 30 may display a confirmation message that that the ballot 40 corresponding to the read machine-readable information 46 was processed. As an alternative to displaying the confirmation (or error) message, kiosk 12 may provide an audio confirmation message through sound system 24 or print a confirmation message through printer 20.

Voting software 30 may also provide names of person for whom ballots were tallied, their addresses, times and places where ballots 40 were cast, and other identifying information from ballot database software 68. As a safeguard against over-voting or voter fraud, voting software 30 may also indicate the number of ballots 40 that were cast for that voter 52 (this number should always be "1"). To prevent vote-buying or voter intimidation, voting software 30 would not, however, reveal the way that voter 52 voted.

Ballot counting system 60 includes processor 62, display 64, and reader 66. Ballot counting system 60 may additionally include an image scanner. Ballot counting system 60 may be located at state-sanctioned facilities, such as a county election commission office.

Processor 62 executes ballot database software 68. Ballot database software 68 stores identifying information for ballots 40 and counts ballots 40. Ballot database software 68 may also store images of individual ballots 40 obtained by scanning ballots 40 by image scanner 70 for later visual verification.

Display 64 displays identifying information and counted results.

Reader 66 reads machine-readable information 46 on ballot 40 and receipt 42. If there were a need for a recount of ballots 40 collected from the polls, reader 66 would read machine-readable information 46 on ballots 40.

Voters 52 who wanted to make sure that their votes were properly tabulated and counted could return to a designated location where ballot counting system 60 was located, and have their receipts 42 read by reader 66. Ballot database software 68 would then display similar types of verifying information as voting software 30. For example, ballot database software 68 may display an image of a ballot 40 that was associated with voter 52 for inspection by voter 52.

If irregularities were found, information on receipt 42 about the time, location, and machine used for voting could help track down the sources of the problems. Printing human-readable information 44 on ballots 40 provides additional safeguards against over-voting, since over-voting would likely occur at times when polls are closed and poll watchers and election judges are not present. The time-stamp on improper ballot would indicate that the ballot was cast at an invalid time.

Figure 2:
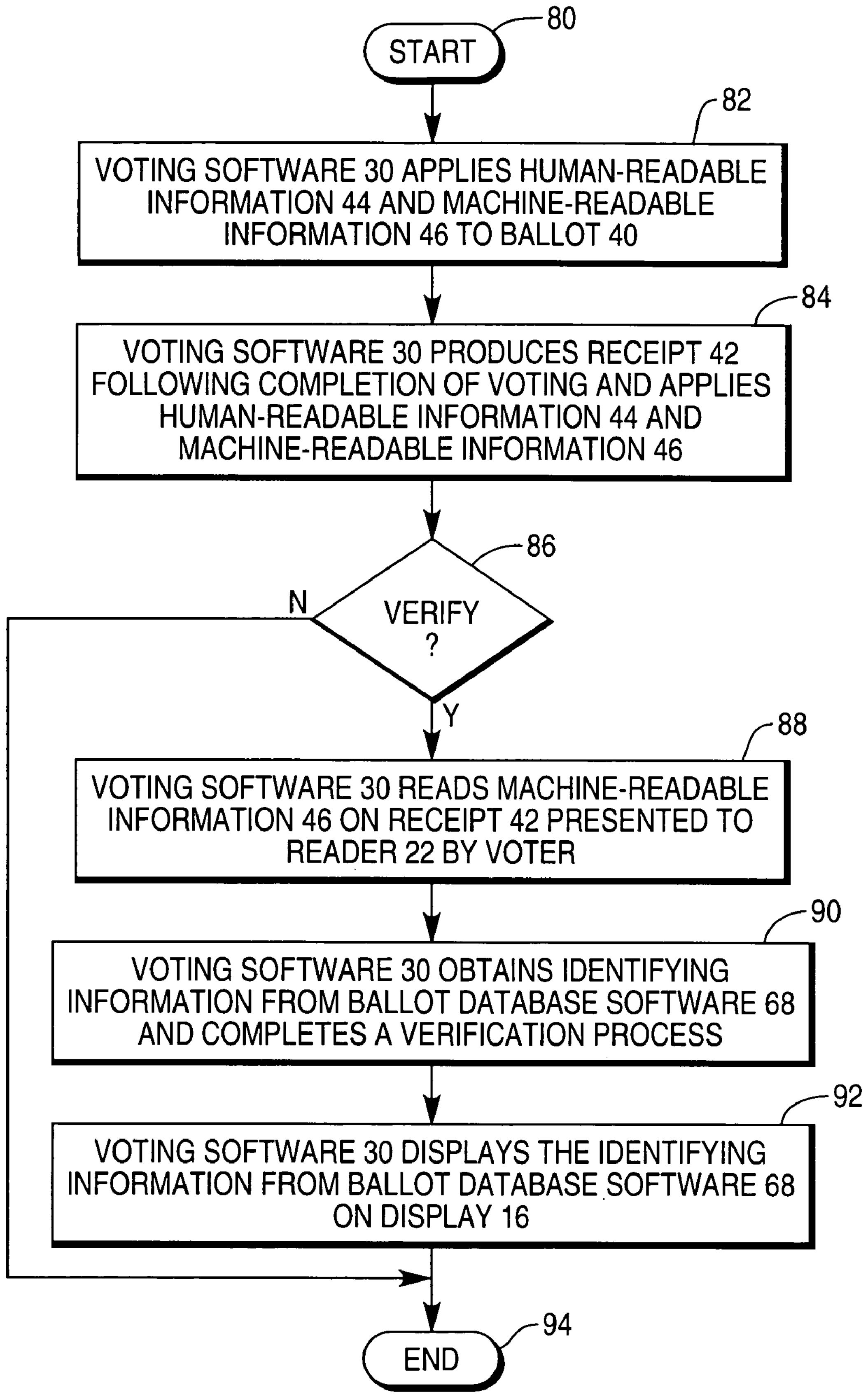
FIG. 2 is a flow diagram illustrating a vote verification method.

Turning now to FIG. 2, an example verification operation is illustrated in detail beginning with START 80.

In step 82, voting software 30 applies human-readable information 44 and machine-readable information 46 to ballot 40.

In step 84, voting software 30 produces receipt 42 following completion of voting and applies human-readable information 44 and machine-readable information 46.

In step 86, voting software 30 provides voter 52 an opportunity to verify that his vote was processed before ballot 40 is deposited into secure collection bin 50. If voter 52 chooses to verify, operation proceeds to step 88. Otherwise, operation proceeds to END 98.

In step 88, voting software 30 reads machine-readable information 46 on receipt 42 presented to reader 22 by voter 52.

In step 90, voting software 30 obtains identifying information from ballot database software 68.

In step 92, voting software 30 displays the identifying information from ballot database software 68 on display 16. Voter 52 may compare the displayed identifying information to human-readable information on receipt 42.

In step 94, operation ends.

Ballot database software 68 may allow voter 52 to complete a similar verification process. Additionally, ballot database software 68 may display an image of a ballot 40 that was associated with voter 52 for inspection by voter 52.

Although particular reference has been made to certain embodiments, variations and modifications are also envisioned within the spirit and scope of the following claims.

What is claimed is:

1. A vote verification method comprising:

a) reading machine-readable information on a voting receipt containing the machine-readable information and human-readable information as a voter presents the voting receipt to a reader;

b) obtaining identifying information associated with a printed ballot of the voter prepared by a computer in response to voter selections entered by the voter using an interface to the computer, the printed ballot including machine-readable information as well as human-readable information corresponding to the machine-readable information;

c) providing the identifying information to the voter so that the voter may compare the identifying information to the human-readable information on the receipt.

2. The method of claim 1, wherein the computer comprises a voting computer and the method fisher includes d) producing the voting receipt for the voter prior to step a).

3. The method of claim 1, wherein step b) comprises:

b-1) obtaining the identifying information from a ballot database using the machine-readable information.

4. The method of claim 1, wherein the computer comprises a ballot counting computer.

5. The method of claim 4, wherein step b) comprises:

b-1) receiving an electronic image of the ballot from an image scanner.

6. The method of claim 5, wherein step c) comprises displaying an image of the ballot.

7. The method of claim 1, wherein step c) comprises displaying the identifying information.

8. The method of claim 1, wherein step c) comprises printing the identifying information.

9. The method of claim 1, wherein step c) comprises auralizing the identifying information.

10. A vote verification system comprising:

a computer including a reader;

wherein the computer is for reading machine-readable information on a receipt containing both the machine-readable information and human-readable information as the voter presents the receipt to the reader, obtaining identifying information associated with a printed ballot of the voter prepared by a computer in response to voter selections entered by the voter using an interface to the computer, the printed ballot including machine-readable information identifying the voter's selections as well as human-readable information corresponding to the machine-readable information, so that a voter may compare the identifying information to the human-readable information on the receipt.

11. The system of claim 10, wherein the computer comprises a voting computer.

12. The system of claim 11, further comprising a printer for printing the receipt.

13. The system of claim 11, further comprising:

a display for displaying the identifying information.

14. The system of claim 11, further comprising:

a printer for printing the identifying information.

15. The system of claim 11, further comprising:

a sound system for auralizing the identifying information.

16. The system of claim 11, wherein the computer is for obtaining the identifying information from a ballot database using the machine-readable information.

17. The system of claim 10, wherein the computer comprises a ballot counting computer.

18. The system of claim 17, further comprising:

a display; and an image scanner for scanning the ballot;

wherein the ballot includes the human-readable information and wherein the identifying information includes the human-readable information; and wherein the computer is for displaying an image of the ballot using the display.

* * * * *